(12) United States Patent
McMilin et al.

(10) Patent No.: US 10,690,776 B2
(45) Date of Patent: Jun. 23, 2020

(54) SPOOFING DETECTION AND ANTI-JAM MITIGATION FOR GPS ANTENNAS

(71) Applicant: The Board of Trustees of the Leland Stanford Junior University, Palo Alto, CA (US)

(72) Inventors: Emily McMilin, Palo Alto, CA (US); David S. De Lorenzo, Palo Alto, CA (US); Per K. Enge, Mountain View, CA (US); Dennis M. Akos, Boulder, CO (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 458 days.

(21) Appl. No.: 15/507,860

(22) PCT Filed: Sep. 4, 2015

(86) PCT No.: PCT/US2015/048708
§ 371 (c)(1),
(2) Date: Mar. 1, 2017

(87) PCT Pub. No.: WO2016/085554
PCT Pub. Date: Jun. 2, 2016

(65) Prior Publication Data
US 2018/0224557 A1    Aug. 9, 2018

Related U.S. Application Data

(60) Provisional application No. 62/151,305, filed on Apr. 22, 2015, provisional application No. 62/046,840, filed on Sep. 5, 2014.

(51) Int. Cl.
*G01S 19/21* (2010.01)
*G01S 19/36* (2010.01)
*H04K 3/00* (2006.01)

(52) U.S. Cl.
CPC ............ *G01S 19/215* (2013.01); *G01S 19/21* (2013.01); *G01S 19/36* (2013.01); *H04K 3/28* (2013.01);
(Continued)

(58) Field of Classification Search
CPC ........ G01S 19/215; G01S 19/21; G01S 19/36; H04K 3/28; H04K 3/90; H04K 3/228; H04K 2203/22; H04K 2203/32
(Continued)

(56) References Cited

U.S. PATENT DOCUMENTS 5,712,641 A * 1/1998 Casabona ............... G01S 19/21
342/362
5,872,540 A    2/1999 Casabona et al.
(Continued)

OTHER PUBLICATIONS

Dehghanian, V., J. Nielsen, and G. Lachapelle, "GNSS spoofing detection based on receiver $C/N_0$ estimates." Proceedings of the 25th International Technical Meeting of the Satellite Division of the Institute of Navigation (ION GNSS 2012), Nashville, TN. 2012 (10 pages).

*Primary Examiner* — Vladimir Magloire
*Assistant Examiner* — Michael W Justice
(74) *Attorney, Agent, or Firm* — Mintz Levin Cohn Ferris Glovsky and Popeo, P.C.

(57) ABSTRACT

There is provided an apparatus comprising an antenna (105) configured to receive a signal from a global navigation satellite system, wherein the antenna includes a first feed and a second feed; a hybrid coupler (110) including a first hybrid input, a second hybrid input, a first hybrid output, a second hybrid output, and wherein the first hybrid output is shifted in phase by 90 degrees relative to the second hybrid output; a variable phase shifter (150) including a shifter input and a shifter output, hybrid output; and a combiner (155) including a first combiner input, a second combiner input, and a
(Continued)

combiner output, wherein the first combiner input is coupled to the shifter output, and the second combiner input is coupled to the second hybrid output, and wherein the combiner output is provided to detection circuitry (197).

11 Claims, 8 Drawing Sheets

(52) U.S. Cl.
CPC ............... *H04K 3/90* (2013.01); *H04K 3/228* (2013.01); *H04K 2203/22* (2013.01); *H04K 2203/32* (2013.01)

(58) Field of Classification Search
USPC .................................................... 342/357.59
See application file for complete search history.

(56) References Cited

U.S. PATENT DOCUMENTS

| | | | |
|---|---|---|---|
| 5,995,044 A * | 11/1999 | Kunysz | G01S 19/22 342/363 |
| 6,861,983 B2 | 3/2005 | Casabona et al. | |
| 2004/0012526 A1* | 1/2004 | Casabona | G01S 19/21 342/428 |

\* cited by examiner

SPOOFING DETECTION AND ANTI-JAM MITIGATION FOR GPS ANTENNAS

CROSS REFERENCE TO RELATED APPLICATIONS

This application is a U.S. National Phase Application no PCT Application PCT/US2015/048708 filed Sep. 4, 2015, entitled "Spoofing Detection and Anti-Jam Mitigation for GPS Antennas," which claims priority to U.S. Provisional Patent Application 62/046,840 filed Sep. 5, 2014, entitled "Spoofing Detection for GPS/GNSS Antennas," and this application also claims priority to U.S. Provisional Patent Application 62/151,305 filed Apr. 22, 2015, entitled "GPS Antenna for Jam Mitigation," the contents of which are hereby incorporated by reference in their entirety.

STATEMENT OF GOVERNMENT SPONSORED SUPPORT

This invention was made with Government support under contract 12-G-003 awarded by the FAA William J. Hughes Technical Center. The Government has certain rights in the invention.

FIELD

The subject matter described herein relates to navigation systems including global navigation systems and/or the global positioning system.

BACKGROUND

Navigation systems today have become ubiquitous. Planes, trains, automobiles, and people often carry some form of navigation or location system that receives signals from global positioning system (GPS) satellites and derives location. As such, when GPS signals are not received due to some form of interference, users may be in a predicament. For example, an aircraft, drone, or vehicle relying on GPS navigation may not be able to operate properly, when there is a GPS signal loss.

SUMMARY

The subject matter disclosed herein provides methods and apparatus related to detecting whether a signal at an antenna, such as a GPS antenna and/or the like, is a spoofing signal and/or steering a null to enable mitigating the effects of a jamming or other unwanted signal.

In some example embodiments, there is provided an apparatus comprising an antenna configured to receive a signal from a global navigation satellite system, wherein the antenna includes a first feed and a second feed; a hybrid coupler including a first hybrid input, a second hybrid input, a first hybrid output, a second hybrid output, wherein the first hybrid input is coupled to the first feed, the second hybrid input is coupled to the second feed, and wherein the first hybrid output is shifted in phase by 90 degrees relative to the second hybrid output; a variable phase shifter including a shifter input and a shifter output, wherein the shifter input is coupled to the first hybrid output, wherein variable phase shifter is configured to induce an additional phase shift; and a combiner including a first combiner input, a second combiner input, and a combiner output, wherein the first combiner input is coupled to the shifter output, and the second combiner input is coupled to the second hybrid output, and wherein the combiner output represents a combined right hand circularly polarized signal and left hand circularly polarized signal, wherein the combiner output is provided to detection circuitry.

In some example embodiments, one of more variations may be made as well as described in the detailed description below and/or as described in the following features. The antenna comprises a GPS antenna. The hybrid coupler comprises a 90 degree hybrid coupler. The combiner comprises a power combiner, such as a Wilkinson combiner. The controller circuitry is configured to change an operating mode of the apparatus from a normal mode for receiving signals transmitted by a GPS satellite to at least a second mode to detect a spoof signal. The apparatus of claim 1, the detection circuitry may be configured to detect one or more of the following: a magnitude of the right hand circularly polarized signal, a $C/N_0$ ripple, a maximum $C/N_0$, a minimum $C/N_0$, a phase offset of the maximum $C/N_0$, and/or a phase offset of the minimum $C/N_0$.

The details of one or more variations of the subject matter described herein are set forth in the accompanying drawings and the description below. Features and advantages of the subject matter described herein will be apparent from the description and drawings, and from the claims.

Figure 1A:
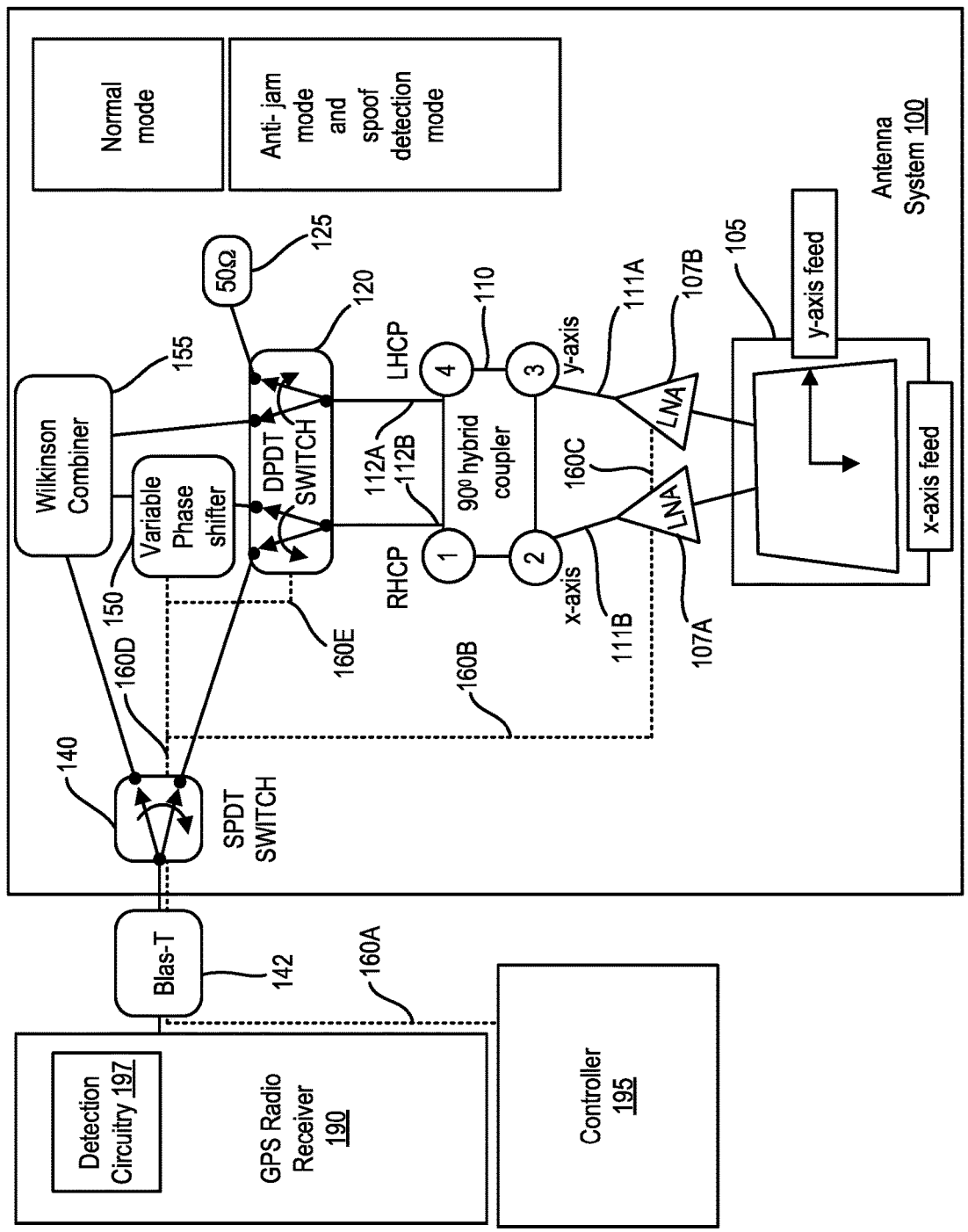
FIG. 1A depicts an example of a GPS antenna system, in accordance with some example embodiments.

Like labels are used to refer to same or similar items in the drawings.

DETAILED DESCRIPTION

In some example embodiments, the subject matter disclosed herein relates to a global positioning system (GPS) antenna system configured to enable the detection of a spoofing signal, such as an unwanted signal meant to interfere with (for example, mislead), a GPS receiver coupled to the GPS antenna system, while avoiding detection.

In some example embodiments, the subject matter disclosed herein relates to a GPS antenna system configured to enable steering a null to attenuate a signal, such as a jamming signal or other type of unwanted or interfering signal.

Although some of the examples disclosed herein refer to GPS, other types of location-based systems including global navigation satellite systems may be used as well.

A GPS antenna may receive signals and then provide the received signals to a GPS receiver to enable the GPS receiver to decode and thus generate location information. For example, a vehicle, such as an aircraft, an autonomous car, a drone, and/or any other vehicle, may have a GPS antenna mounted at a location that is in view of heavens where GPS satellites are located. In this way, the aircraft's GPS antenna may receive the GPS signals emanated from the satellite and provide the received signals to a GPS receiver, which generates location information to enable aircraft navigation, for example. In some instances, a transmitter may transmit a spoofing signal to intentionally or unintentionally interfere with or jam the GPS receiver. Unlike genuine GPS satellite signals, the spoofing signals may be transmitted by a transmitter located at or below the horizon, such as at ground level.

In some example embodiments, there may be provided a GPS antenna system that enables at least the detection of a spoofing signal. In this spoof detection mode, the GPS antenna system, in accordance with some example embodiments, may process the received GPS signals in order to detect whether the received GPS signal is an actual GPS signal received from for example a GPS satellite or a spoof signal received from for example a below-the-horizon, or terrestrial, transmitter. In some example embodiments, this detection may be performed by detection circuitry is configured detect one or more of the following features in a combined right hand circularly polarized (RHCP) and left hand circularly polarized (LHCP) signal: the RHCP signal magnitude relative to the LHCP signal magnitude, a $C/N_0$ ripple, minimum and maximum phase offset, maximum and minimum $C/N_0$, and/or other measures or statistics obtained from the combined RHCP and LHCP signal.

In some example embodiments, there may be provided a GPS antenna system that enables at least the steering of a null towards an unwanted signal (for example a jamming signal or a spoofing signal) to attenuate the unwanted signal. In this anti-jam mode, the GPS antenna system, in accordance with some example embodiments, may process the received GPS signals and steer a null in the direction of the spoof or jamming signal received from a below-the-horizon, or terrestrial, transmitter.

In some example embodiments, a GPS antenna system may include a normal mode as well as a spoof detection mode and/or an anti jam mode (in which a null is steered in the direction of a signal, such as the jamming or spoofing signal). In normal mode, the GPS antenna system may be configured such that it provides GPS signals received from a GPS satellite to a GPS receiver.

FIG. 1A depicts an example of a GPS antenna system 100, in accordance with some example embodiments.

The GPS antenna system 100 may include a single GPS antenna 105 coupled to processing circuitry including amplifiers, such as low noise amplifiers 107A-B coupled to a 90 degree hybrid coupler 110; a switch 120 for selecting between modes; a termination 125 to terminate the LHCP signal while in normal mode; a variable phase shifter 150 to further vary the phase of the RHCP signal, when in a spoof mode or an anti-jam mode; a power combiner 155 (labeled Wilkinson combiner) to combine the RHCP 112B and LHCP signals, when in a spoof mode or an anti jam mode; and/or a switch 140 to switch between modes.

Moreover, system 100 may include, or be coupled to, a controller 195, a GPS radio 190, and/or a bias T 142. The GPS radio receiver 190 may include detection circuitry 197 configured to detect whether the received signal is likely a genuine GPS signal (which would be received from the heavens where GPS satellites are located) or a jamming/spoofing (which may be located at or below the horizon).

Although FIG. 1A depicts detection circuitry located at the GPS receiver 190, it may be located in other locations as well. The detection circuitry may be configured to process the combined RHCP and LHCP signal provided by combiner 155 to perform detection as disclosed herein. The detection circuitry 197 may compare the magnitudes of the RHCP signal and LHCP signal to determine whether the received signal is likely a genuine GPS signal or a spoofing signal. For example, GPS signals received from a GPS satellite may be primarily RHCP as described further below. Moreover, the $C/N_0$ ripple may be indicative of whether the received signal is likely a genuine GPS signal or a spoofing signal.

Unlike anti jam mode, the change of state into spoof detection mode may be triggered according to a deterministic schedule and may thus last for a certain time, such as a predetermined time period.

Unlike a jamming signal, the spoof signal may be implemented to evade detection, so there might not be a readily observable trigger. As such, the spoof mode may include a preemptive scan for the presence of spoof signals in accordance with for example a predetermined schedule.

Figure 1B:
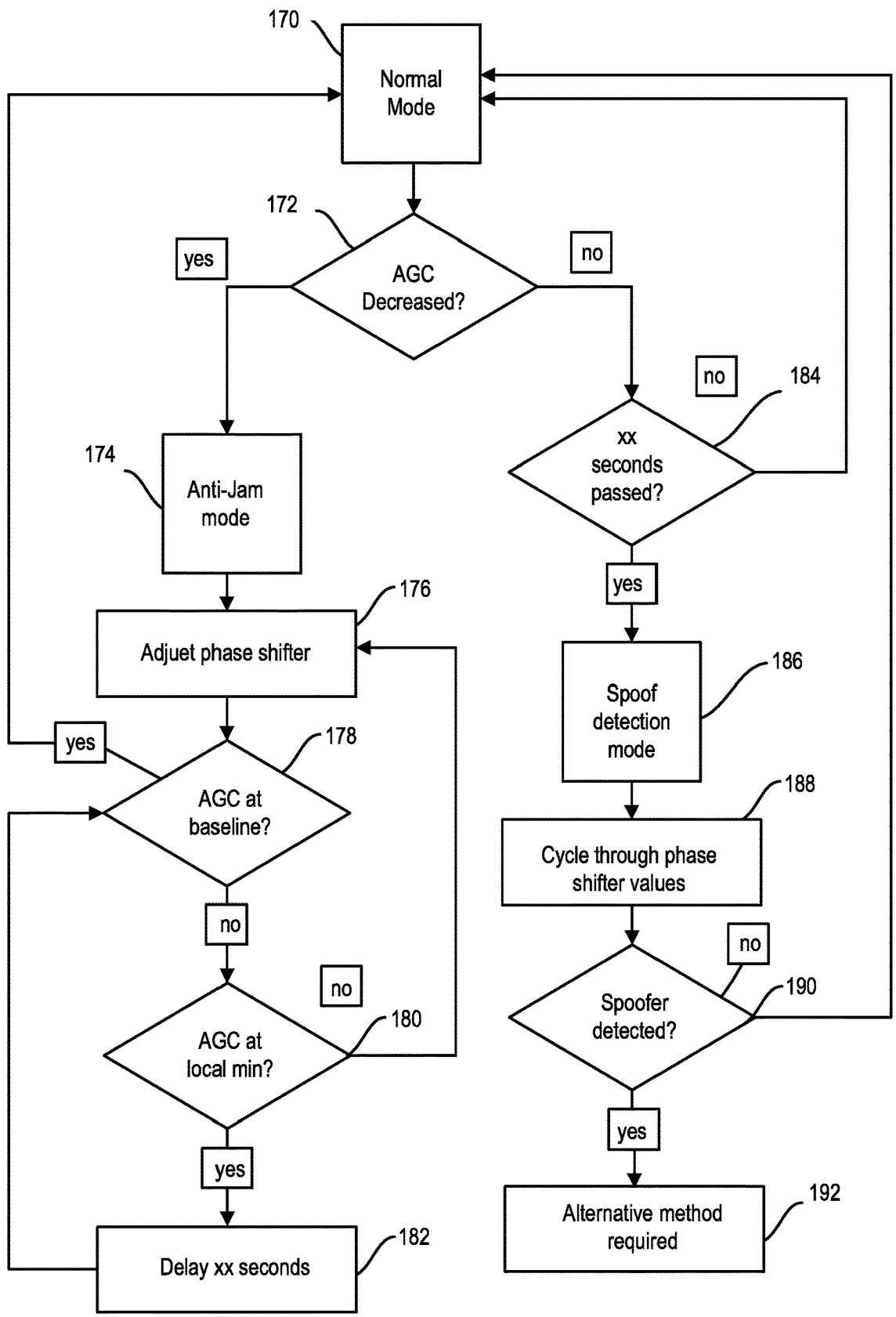
FIG. 1B depicts an example process for the GPS antenna system, in accordance with some example embodiments.

FIG. 1B depicts an example process for the multimode GPS antenna system, in accordance with some example embodiments. The antenna system may be in a normal mode at 170, in which the switches 120 couple the hybrid coupler output directly to the GPS radio receiver as noted above. If the AGC inherent in the GPS receiver (for example, as determined by detection circuitry 197) reports an decrease in the AGC 172, then the antenna system may then enter anti-jam mode 174, in which the switches 120 couple the hybrid coupler output to the variable shifter and combiner as noted. At 176, the variable phase shifter 150 may be adjusted until the AGC returns to a baseline value 178 or reaches a local minimum 180. In the case of the a local minimum 180, the antenna system may delay for a certain time (for example, 2 seconds although other times may be used) before checking again to see if AGC has returned to a baseline value or a minimum value. If a baseline AGC value has been achieved, then it is likely that the jamming signal is no longer affecting the antenna system at all, in which case a return to normal state 170 occurs.

While in the normal state 170, the antenna system may periodically conducts a spoof detection test after a given amount of time has passed 184 (for example, 60 seconds, although other times may be used as well). Alternatively or additionally, the antenna system may constantly conduct spoof detection, in which case the time may be set to 0 delay (or never conduct spoof detection, in which case the delay is very large). If a certain time period elapses without a spoof detection test, we then enter spoof detection mode 186, in which the switches in FIG. 1A 120 will be configured to couple the hybrid output to the variable phase shifter and combiner as noted. As such, the variable phase shifter 150 will be cycled, at 188, through a full 360 degree rotation of phase shifter values. The duration of the cycle may be for example 5 seconds, and one to two cycles may be required. If a spoofer is detected 190 (as noted below), then an alternative state may be triggered. In some instances, the phase shift values may be slowly adjusted while detecting if spoofer is still present (or has been nulled by the phase shifter).

Figure 2:
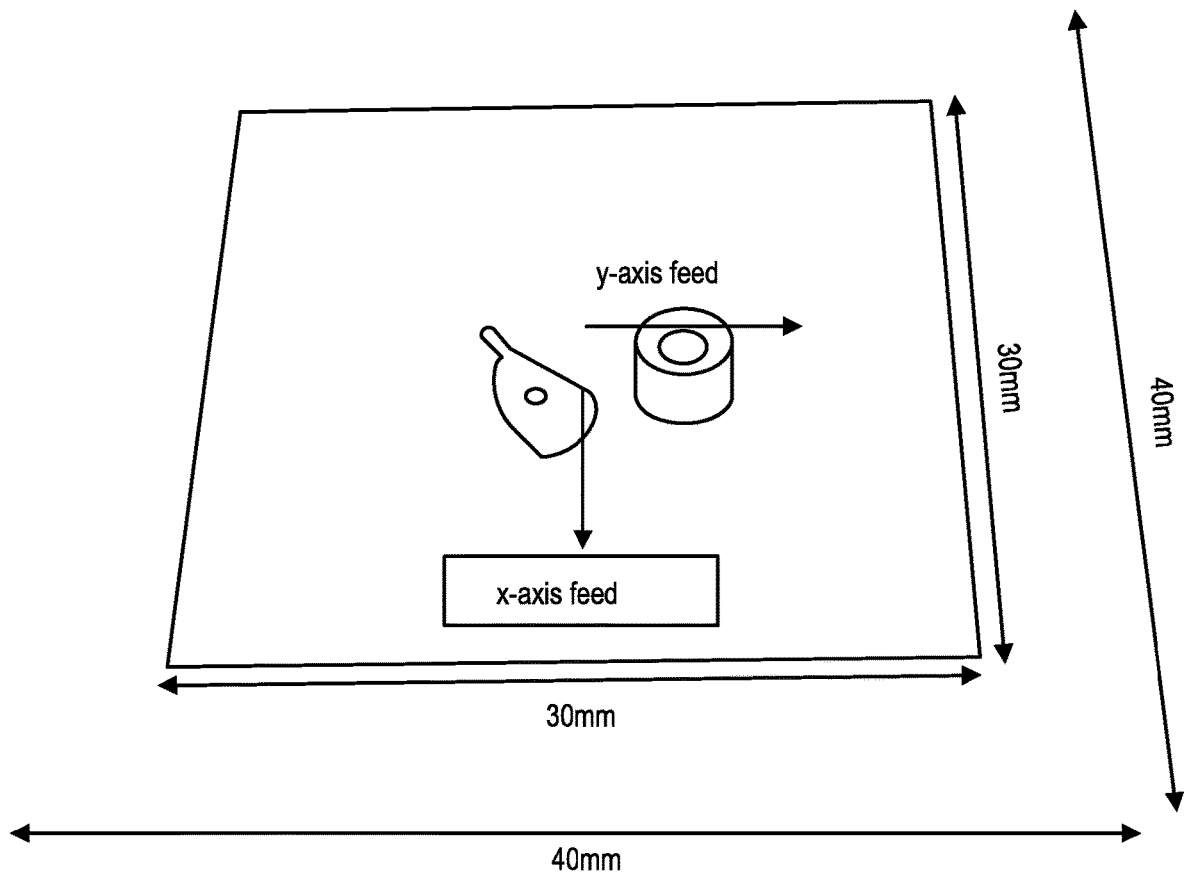
FIG. 2 depicts an example of a GPS patch antenna, in accordance with some example embodiments.

The GPS antenna 105 may be implemented in a variety of ways. For example, GPS antenna 105 may include an x-axis feed and a y-axis feed. In some example embodiments, a GPS patch antenna may be used. This antenna may be in accordance with ARINC 743 form-factor constraints. An example of the GPS patch antenna is shown in FIG. 2. In the example of FIG. 2, the GPS patch antenna is a 40 mm by 40 mm substrate with a 30 mm by 30 mm square copper patch on top, and the substrate, at 1.28 mm thick, is a single layer of Rogers RO3010 material that has a dielectric constant of 10.2, although other dimensions and substrates may be used as well. The high dielectric constant permits a relatively small form-factor half wavelength resonant antenna. The GPS patch antenna may include two perpendicular coaxial feeds. A coordinate system may be selected such that one of the feeds can be referred to as an x-axis feed and the other the y-axis feed, as shown in the FIG. 2. The GPS antenna may be configured to be mounted on a large conductive body, such as the fuselage of an airplane, and/or any other vehicle.

Signals obtained from a GPS satellite may be right hand circularly polarized (RHCP), and arrive in the upper hemisphere of a standard receive GPS antenna 105. Thus, GPS receive antennas 105 may be configured for sensitivity to RHCP signals in the upper hemisphere. Moreover, when the GPS antenna 105 is mounted on a vehicle such as the airplane fuselage, the fuselage may serve as a ground plane. And, this ground plane may enable the antenna system 100 to resolve two phase coherent components from a single incident waveform including the signals of interest. However, GPS antennas may also have some sensitivity to left hand circularly polarized (LHCP) signals generated to do multi-path, ground-plane effects, and/or the like. The total sensitivity of the GPS antenna 105 is the sum of the RHCP and LHCP sensitivities. A performance metric that reflects the GPS antenna's ability to distinguish the RHCP energy from the total energy it receives is referred to as the cross-polarization discrimination (XPD) factor, and is defined in dB units as follows:

$$XPD(\theta,\varphi)=GRHCP(\theta,\varphi)-GLHCP(\theta,\varphi) \quad \text{Equation 1,}$$

wherein, for each potential signal direction of arrival (DoA $(\theta, \varphi)$) in spherical coordinates, $\theta$ represents elevation angle, $\varphi$ represents azimuth angle, GRHCP represents the RHCP antenna gain in that given direction, GLHCP represents the LHCP antenna gain in that given direction. Gain and sensitivity may be referred interchangeably due the reciprocal nature of a passive GPS antenna.

The GPS antenna 105 may be designed to optimize, as noted, cross-polarization discrimination, XPD, in the upper hemisphere (where the GPS RHCP signals are transmitted) as the presence of any upper hemispheric LHCP sensitivity proportionately reduces the antenna's sensitivity to the satellite's RHCP signals.

Figure 3:
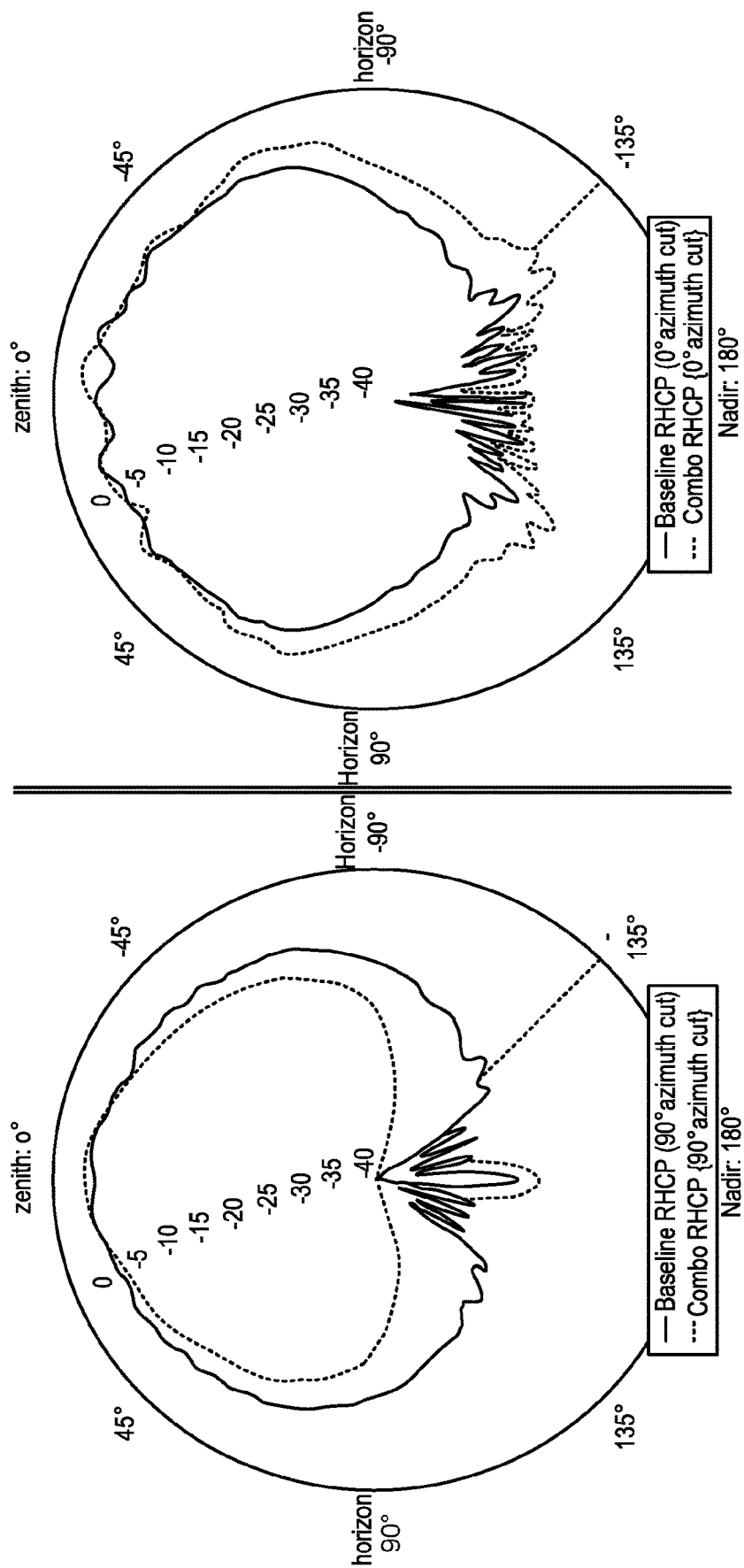
FIG. 3 depicts example of antenna patterns, in accordance with some example embodiments.

FIG. 3 depicts an example of a plot of the RHCP gain of antenna 105. On the right hand side of FIG. 3, the constructive interference radiation patterns are shown, while on the left hand side, the destructive interference radiation patterns. The traces in these plots show two perpendicular 2-D cuts of a single 3-D radiation gain pattern. Specifically, the solid lines represent a static, baseline 3-D radiation pattern, and the dashed lines represent the dynamic 3-D radiation pattern that arises when a null has been steered, in accordance with some example embodiments, along the 90 degree azimuthal plane. The dashed lines are referred to as dynamic in the sense that the values may change based on the values of the variable phase shifter. Patterns may be derived from the same simulated data of a standard form-factor GPS antenna on an 800 mm diameter by 1200 mm length cylindrical ground plane, although other patterns may be realized in other ways as well.

When comparing the baseline RHCP radiation pattern (solid lines) to the combined (dashed traces/lines) RHCP radiation pattern, there are significant nulls (for example, greater than about 10 dB) and modest antenna beams (for example, about 3 dB) appearing in the lower hemisphere of the plots for these two azimuthal cuts. The combination antenna pattern (shown by the dashed trace) arises when the baseline pattern is squeezed along one 2-D plane, and thus slightly bulging along the perpendicular plane. As such, the dynamic component of the combination radiation patterns may be considered largely in the lower hemisphere (where one would expect to see spoof/jamming signals and the like), while the upper hemisphere remains unperturbed. Moreover, in the lower hemisphere the nulls are relatively deep and over a relatively wide range of elevation angles (comparable to, for example, null depths that could be expected from much larger multi-antenna array systems). As can also be seen in FIG. 3, due to the symmetry present in our single antenna element, when a null is steered to the 90 degree azimuthal plane, nulls will arise in both the +90 and the −90 degree azimuthal angles.

Electromagnetic waves can propagate through both free space, such as the space between the GPS satellites and antenna 105, and along conductive structures, such as the coaxial cables that deliver the electromagnetic wave from the antenna 105 to receiver 190. However, certain mediums and geometries only support certain types of electromagnetic fields. The waves that travel from the GPS satellites to antenna 105 may take the form of transverse electromagnetic plane waves. In the case of GPS for example, the electromagnetic plane waves may be RHCP. An RHCP wave can be decomposed into two orthogonal electric field components (for example, an x-axis field and a y-axis field). These two electric field components are not only orthogonal in space, but also in time, so the x-axis field lags the y-axis field by 90 degrees.

When an RHCP wave is directly incident upon a GPS antenna, the two orthogonal electric field components may excite both feeds on the antenna, with a portion of the wave energy lagging by 90 degrees in time. For example, the RHCP wave from a GPS satellite may be directly incident on a GPS antenna mounted on the heavenly facing surface of a vehicle, such as an aircraft.

But when an RHCP (or any arbitrarily polarized) wave is directly incident upon the conductive ground plane, the electromagnetic wave may induce surface currents along the ground plane. For example, a signal that is at or below the horizon of the vehicle may be directly incident on the GPS antenna's ground plane. Despite the considerable losses endured in this ground plan transmission mechanism, some of these surface currents may travel along the body of the ground plane until they reach the antenna 105 where they will induce a potential difference between the ground plane and the conductive patch of the antenna. In this case, there may be no 90 degrees time shift between any energy that may excite the two feeds of antenna 105. In other words, the energy field may thus be present at both antenna feeds, x and y, at the same time, without the time delay characteristic of circularly polarized fields. For this reason, the electric field induced by a surface current is electrically similar to that induced by a vertically polarized (VP) electromagnetic plane wave, so herein these signals are referred to as vertically polarized, VP, signals.

If a signal is vertically polarized, it is unlikely that the signal originated from a GPS satellite (although with some low elevation GPS satellites, the signal waveforms may appear to be largely VP to a patch antenna). Specifically, when antenna 105 is mounted on top of a large ground plane (such as an aircraft, for example), any signals that reach the antenna due to the propagation of surface currents may do so because a direct path to the antenna is blocked by the ground plane. And, these signals may thus originate from beneath the horizon of the antenna 105. As such, signals having VP fields may generally be considered to originate from elevation angles below the horizon of antenna 105. Detection circuitry 197 may be used to detect the relative presence of the VP signals.

Moreover, a VP signal may be decomposed into an RHCP signal and a LHCP signal, with both signals having substantially equal magnitude and phase coherency. And, as noted, a standard GPS antenna may be configured to provide the LHCP signal in addition to the RHCP signal. This VP signal may have an XPD ratio of about 0 dB as the RHCP and LHCP components, in the case of VP signals, may have about the same magnitude. Detection circuitry 197 may be used to detect this ratio.

Accordingly, the RHCP signal and the LHCP signal may be phase coherent components of the incident, received signal waveform, and may have similar magnitude but shifted in phase. In some example embodiments, the relative phase shift between these two signals may be a function of azimuthal angle from which the original waveform originated. Detection circuitry 197 may be used to detect the azimuthal angle or phase.

In some example embodiments, a null may be steered toward that azimuthal angle from which the waveform originated. To achieve the null in the antenna pattern toward that azimuthal angle from which the waveform originated, circuit 100 may, in accordance with some example embodiments, induce an additional phase shift. This induced phase shift when added to the relative phase shift yields a 180 degree phase difference between the RHCP and LHCP signals. Circuit 100 may introduce a relative phase shift ψ to steer a null toward φ in accordance with the following:

$$\psi = 2(\varphi - \varphi_0) + 90° \quad \text{Equation 2,}$$

wherein $\varphi_0$ is an azimuthal angle of the x-axis feed (simply to establish a relative coordinate system), φ is the desired azimuthal angle for null. The relative phase shift ψ has twice the periodicity of φ. Referring to again to FIG. 3, the symmetry caused a null to appear simultaneously at both the +90 degree and the −90 degree azimuthal angles. Additionally, the fixed term in Equation 2 is equal to 90° to compensate for the additional 90 degrees introduced by the 90 degree hybrid coupler.

After inducing in the RHCP signal the additional phase shift noted above, the shifted versions of the RHCP and LHCP signals may be combined to obtain a destructive interference signal. In this way, the null gets steered in azimuth.

With respect to elevation, the nulls and beams may be fixed to the lower hemisphere, when the received RHCP and LHCP are similar in magnitude (or have an XPD ratio of about 0 dB). In contrast, most GPS antennas have XPD ratios exceeding 13 dB in the majority of the upper hemisphere. And, the RHCP gain in the upper hemisphere is generally at least 20 times stronger than the LHCP gain. As such, the greatest null/beam achieved in upper hemisphere may only cause about 5% reduction/increase in gain.

Upon processing in a GPS receiver, an apparent ripple in carrier-to-noise density, $C/N_0$, may arise from periodic combinations of constructive and destructive interference described above. This ripple (which may be detected by detection circuitry 197) in dB-Hz for the $n^{th}$ satellite may be calculated as follows:

$$\begin{aligned} R_n &= \text{Constructive}_n - \text{Destructive}_n \quad \text{Equation 3} \\ &= 10\log(g_{RHCP}(\theta_n, \phi_n) + g_{LHCP}(\theta_n, \phi_n)) - \\ &\quad 10\log(g_{RHCP}(\theta_n, \phi_n) - g_{LHCP}(\theta_n, \phi_n)) \\ &= 10\log\left(\frac{xpd(\theta_n, \phi_n) + 1}{xpd(\theta_n, \phi_n) - 1}\right), \end{aligned}$$

wherein $(\theta_n, \varphi_n)$ are the elevation and azimuth angles of the $n^{th}$ satellite being tracked and the antenna gain, g, and cross polarization ratio, XPD, are shown in lower case to indicate that we are specifying the linear representation of the term, instead of its dB representation (as is done otherwise herein). As the magnitudes of the RHCP and LHCP signals may become more similar (or the XPD ratio approaches 0 dB), the $C/N_0$ ripple may approach infinity. Detection circuitry 197 may be used to detect the depth or intensity of the ripples as an indicator that the signal is a spoof signal. Moreover, an infinitely deep null may be steered towards an azimuthal direction in the lower hemisphere where the XPD ratio equals 0 dB.

Referring again to FIG. 1A, each of the feeds may be coupled to an input of an amplifier, such as low noise amplifiers 107A-B. The output of the low noise amplifier 107A may be coupled to an input port of a 90 degree coupler 110, and the output of the low noise amplifier 107B may be coupled to an input port of a 90 degree coupler 110. The 90 degree hybrid coupler introduces a 90 degree phase shift to the x-axis input signal 111B or the y-axis signal 111A. The output signal 112A corresponds to a left hand circular polarized (LHCP) signal, while output signal 112B corresponds to a right hand circular polarized (RHCP) signal.

Power combiner 155 combines the RHCP output signal 112B (which has been shifted in phase by variable phase shifter 150) with the LHCP output signal 112A. The variable phase shifter 150 may vary the phase of the right hand circular polarized signal output 112B provided by the 90 degree hybrid coupler 110. The amount of phase variance may be under the control of controller 195. The phase shifter may not cycle through all 360 degrees of phase shift values at a speed that approaches the $C/N_0$ integration period of the receiver. Many receivers use a $C/N_0$ integration period that equal approximately 400 millisecond (ms) for example. Additionally, the phase shifter may not be configured to cycle too slowly, such that a detection period takes a relatively long period of time. For example, an ideal time period (through which the phase shifter may cycle through all 360 degrees) may be about 5 seconds. Two to four periods of full 360 degree rotations may be required, in some implementations.

In the example of FIG. 1A, the controller 195 may control switch 140, such that the combiner 155 output is coupled to the GPS radio (via for example bias T 142). For example, lines 160A-E may be used to provide control and/or power to one or more components of system 100.

When the controller 195 configures the switches for a normal mode, the circuit 100 is configured to provide a normal signal path from the GPS antenna 105 to the GPS receiver 190. As noted, for a genuine GPS signal received at the GPS antenna, the magnitude of the RHCP at 112B is relatively much greater than the magnitude of the LHCP signal at 112A. As such, when system 100 is in a normal mode, the switch 120 couples the RHCP signal 112B to the GPS receiver 190 via for example switch 140, a bias T 142 for example. In the example of FIG. 1A, the switch 120 and 140 is under the control of controller 195 to provide the switching needed for the normal mode. The bias T may be used to provide a bias current to power components, such as the LNAs and the like or may be integrated into the GPS radio receiver 190. Thus, in the normal mode, the system 100 couples the RHCP signal to the GPS radio receiver for further processing. And, the LHCP signal at 112A may be much weaker than the RHCP signal, so it may be terminated into for example a 50 Ohm termination 125.

When the controller 195 configures the switches for a spoof detection mode (or anti-jam mode), the switch 120 couples the phase shifter RHCP signal output 112B to a variable phase shifter 150 and a combiner 155, and this switch 120 couples the phase shifter LHCP output signal 112A to the combiner 155, which combines, as noted, the LHCP and RHCP signals before being provided to the GPS receiver 190.

In some example embodiments, in spoof detection mode (or anti jam mode), the variable phase shifter 150 (which is under the control of controller 195) provides additional phase shifting of the RHCP signal component to a certain, so-called "ideal" w value, such that the RHCP signal is 180 degrees out of phase with the LHCP one. After this additional w phase shift that provides the 180 phase difference, when the RHCP and LHCP signals are combined at combiner 155, a null is generated (for example, steered) in a desired φ direction.

As noted above, there is deterministic mapping between an azimuthal angle of interest, φ, and the ideal phase shift, w provided by the variable phase shifter 150. The variable phase shifter 150 may be controlled in a variety of ways. However, in some implementations, the control may be integrated with the GPS receiver 190, in which case a power minimization protocol running on the receiver in the digital domain may be implemented. This protocol can adapt a DC voltage control signal that is coupled onto the inner conductor of the RF coaxial cable, in order to establish an optimal phase shift. The AGC may be one optimal, low complexity and backward compatible mechanism for implementing the power minimization algorithm.

Full receiver integration may include a firmware upgrade that links the output of the AGC to the voltage signal that controls the phase shifter in the antenna, with a feedback loop that will settle at the AGC's default (interference-free) baseline level. The inner conductor of the coaxial cable may also continue to serve in its normal capacity to power the LNAs (and other components) inside the antenna assembly, and thus some simple power smoothing circuitry may be implemented such that the nanosecond duration dips in voltage do not adversely affect the LNAs. A microcontroller serving as controller 175 may likely reside inside the antenna assembly to control predetermined functionality based on the control voltages received.

Figure 4:
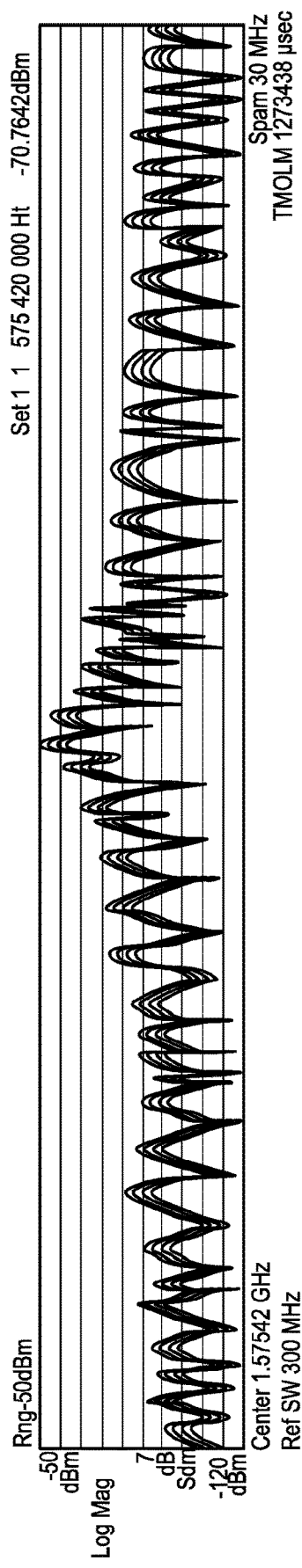
FIG. 4 depicts an example plot of spoof signal, in accordance with some example embodiments.

FIG. 4 depicts an example of a spoof signal that can be transmitted to jam or otherwise interfere with the GPS radio receiver 190. This spoof signal is at a center frequency of 1.575 GHz with −65 dBm to −75 dBm of power, although other frequencies and powers may be used as well. The spoof signal may thus serve as both a jamming source and a spoofing source.

Figure 5:
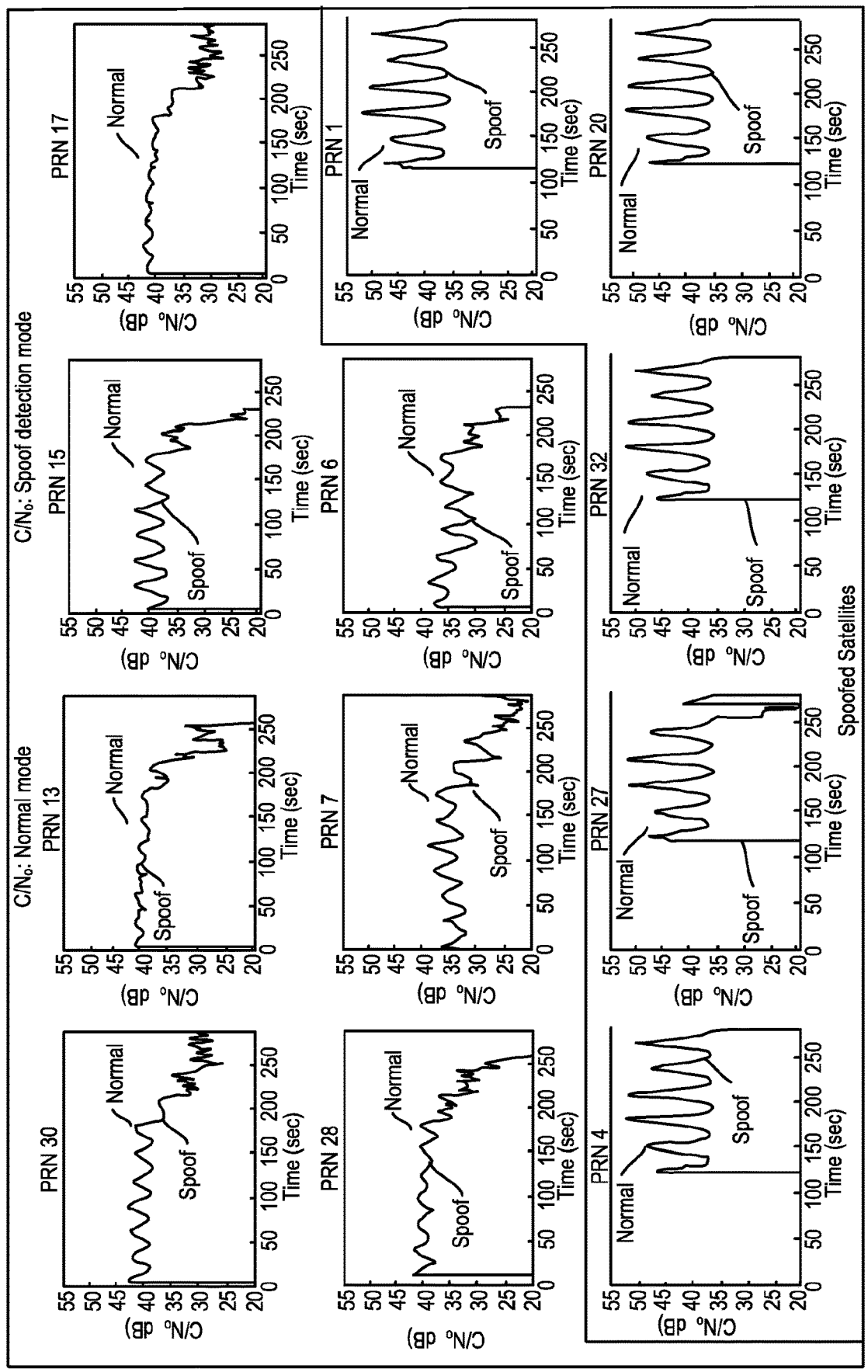
FIG. 5 plots carrier-to-noise density, $C/N_0$, for normal mode operation and spoof detection mode operation for a GPS antenna system, in accordance with some example embodiments.

As calculated above, the amplitude of the ripple in $C/N_0$ (as shown at FIG. 5) is a function of the XPD, which can be processed and detected by detection circuitry 197. The XPD may be higher for high elevation satellites, but lower for low elevation satellites. For the spoof signal originating from below the horizon, the XPD may approach a value of 0 dB, leading to large amplitude swings. The plots show relatively low amplitude swing for the higher elevation satellites (17, 13, 28 and 30), a larger amplitude swing for the lower elevation satellites (6, 7, 15), and the largest amplitude swing for the spoof signal sources (1, 4, 20, 27, 32). Detection circuitry 197 may be used to detect the relative amplitudes. Each unique satellite may have its own fingerprint comprising swing amplitude and phase offset in the time domain of where the peaks and troughs fall during the 28.8 second cycle. These fingerprints may also be detected by detection circuitry 197. However, the spoof signal sources may be from a single location that shares the same $C/N_0$ amplitude and time domain offset with one another. The same or similar $C/N_0$ amplitude and time domain offset feature may also be detected by detection circuitry 197.

Figure 6:
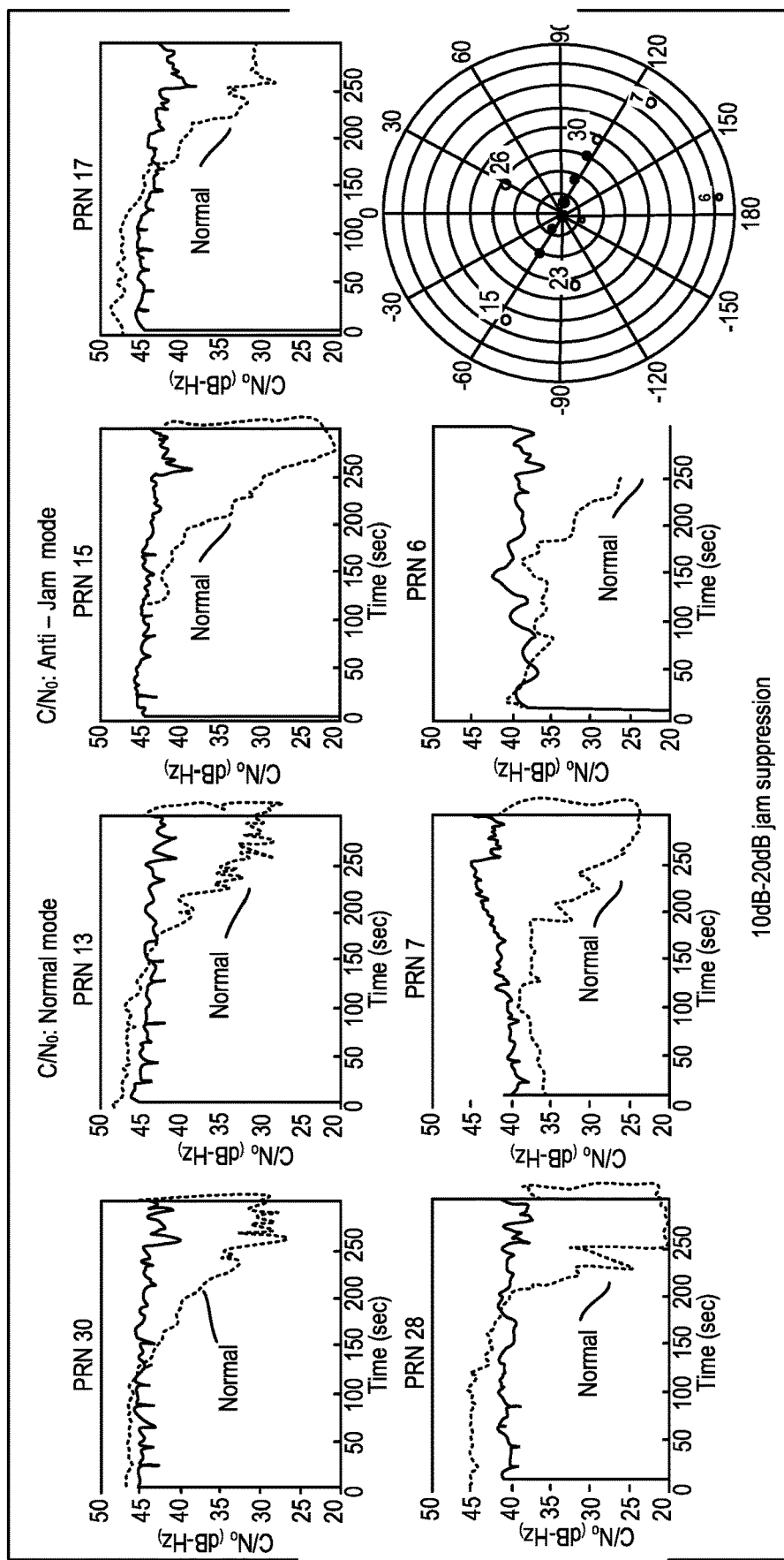
FIG. 6 plots carrier-to-noise density, $C/N_0$, for normal mode operation and anti jam mode operation for a GPS antenna system, in accordance with some example embodiments.

FIG. 6 shows the $C/N_0$ values for satellites signals, which were received by the GPS antenna system 100 in accordance with some example embodiments. In the case of FIG. 6, a null is steered the in direction of the jammer, and, as such, the anti-jam mode $C/N_0$ performance may be considered superior to that of the normal mode $C/N_0$ performance. This improvement in $C/N_0$ performance may indicate that a null has been successfully steered toward the jammer. Any operator of a GPS system may use the $C/N_0$ performance as a visual indicator, when selecting the proper variable phase shift value. However, a more desirable implementation may involve integration with a standard GPS receiver to include a power minimization algorithm running on the receiver in the digital domain. This process may adapt the voltage control signal coupled onto the co-axial cable, in order to establish an optimal phase shift that indicates that the null has been successfully steered toward the jammer. The following provides an example implementation for this process.

To illustrate by way of an example implementation, a GPS radio receiver may include an analog-to-digital converter (ADC) that follows the analog radio front-end and precedes the digital acquisition and tracking algorithms. After the ADC, the analog signal captured by the receiver is now a digital sequence of "n" bits, where n is a fixed number of bits corresponding to the ADC during the conversion. A receiver with an ADC where n<1 may also contain an automatic gain control (AGC) component. ADCs have a limited dynamic range of power levels under which they can optimally convert the incoming analog signals into their digital counterparts. Thus, in order to capture the largest range of incoming signals, it is desirable to place the average signal power in the middle of the ADC's dynamic range, and this is the job of the AGC. For example, with a two bit ADC in which "<00>" represents the weakest signal and "<11>" represents the strongest, if the AGC fails to center the average signal power in middle of this range (and instead lets the signal drift upward), the measured samples may all appear to be of value <11>, without variation. In this example, important information may have been "clipped" away and forever lost. It should also be noted that although the GPS signal power is below the thermal noise floor, it is also the case that the power level of the noise signal is not stable and requires AGC. Some AGCs operate on time constants of microseconds, which may be several orders of magnitude faster than the integration dump period of a standard GPS receiver. As such, loss of carrier lock or other ill effects may not be experienced with the relatively sluggish AGC of this example. The AGC may thus be used as a power minimization (PM) algorithm.

Full receiver integration may be implemented via a firmware upgrade that links the output of the AGC to the voltage signal that controls the phase shifter in the antenna, within feedback loop that will settle at the AGC's default (interference-free) baseline level. The inner conductor of the coaxial cable may also continue to serve in its normal capacity to power the LNAs (as is done in standard GPS receivers) and other components inside the antenna assembly. Thus some simple power-smoothing circuitry may be implemented such that the nanosecond duration dips in voltage do not adversely affect the LNAs. A microcontroller may reside inside the antenna assembly to control predetermined functionality based on the control voltages received.

FIG. 6 compares expected results for the direct "Normal mode" stream (in green) and the "Anti jam mode" stream (in red), when the variable phase shifter has been set to a phase shift value that steered a null toward the direction of the jamming signal. FIG. 6 depicts a sky map with a black dotted line to indicate the direction of the x-axis antenna feed and a purple arrow to show the direction of the jamming signal perpendicular to the direction of the x-axis antenna feed. In this drawing, satellite PRN 17 is almost directly overhead, satellite PRN 28 is in the direction of the jamming signal, satellites PRN 15 and PRN 30 are approximately orthogonal to the direction of the spoofed signal, and satellites PRN 6 and PRN 7 are at low elevation angles. As times passes (x-axis of FIG. 6), the jamming signal increases its elevation angle (from well below the antenna to at the horizon to the antenna). We can see that the drop in the green normal mode $C/N_0$ is correlated with the increase in the elevation angle of the horn transmitting the jamming signal. When the jamming signal is incident upon the "fuselage" at a lower elevation angle, it must propagate along the ground plane for a longer distance before it reaches the antenna, and thus is further attenuated. As the jamming signal increases its elevation angle up to the horizon of the antenna, however, the effective signal strength of the jamming signal increases despite no change in the transmission power level. Consequently, later in the signal recording we are more likely to see a loss of lock on satellite signals. This is particularly the case for the lower-elevation satellites (PRNs 6, 7, and 15), which already had a lower initial normal mode C/NO prior to the introduction of the jamming signal. Now, turning to the red anti-jam $C/N_0$ traces, we see jam suppression ranging from about 10 decibels to greater than 20 decibels. Anti-jam performance for the high-elevation satellites (PRNs 13, 17, and 30, but excluding satellite PRN 28) increases to around 10 decibels of jam suppression. Furthermore, jam suppression of the lower-elevation satellites (PRNs 6, 7, and 15) as well as PRN 28 is generally 20 decibels or better, avoiding a loss of lock for several satellites (when compared to the normal mode performance). The jamming signal originates from the same direction as satellite PRN 28 (sky plot in lower right-hand corner of FIG. 6); thus, a radiation pattern null has been formed along a line in the azimuthal plane that is parallel to satellite PRN 28. Simultaneously, a slight radiation pattern beam has been formed along the line perpendicular to the direction of the spoofer in the azimuthal plane (indicated by the black dotted line on the sky plot). This dotted line happens to run between satellites PRN 15 and PRN 7. Thus, in satellite PRN 28 we see a slight reduction in anti-jam mode $C/N_0$ as compared to normal mode $C/N_0$ before the jamming signal has begun to degrade the normal mode $C/N_0$ (and we also see more dramatic jam suppression as the effective signal strength of the jammer increases). By contrast, in satellites PRNs 15 and 7, we see a slight increase in the anti-jam mode $C/N_0$ as compared to normal mode $C/N_0$ even before the jamming signal has begun. This superior performance of anti jam mode $C/N_0$ as compared to normal mode $C/N_0$ continues for satellites PRNs 15 and 7 as the effective jamming signal strength increases, because of the compounded effects of the beam steered toward these two satellites and the null steered toward the jammer.

Figure 7:
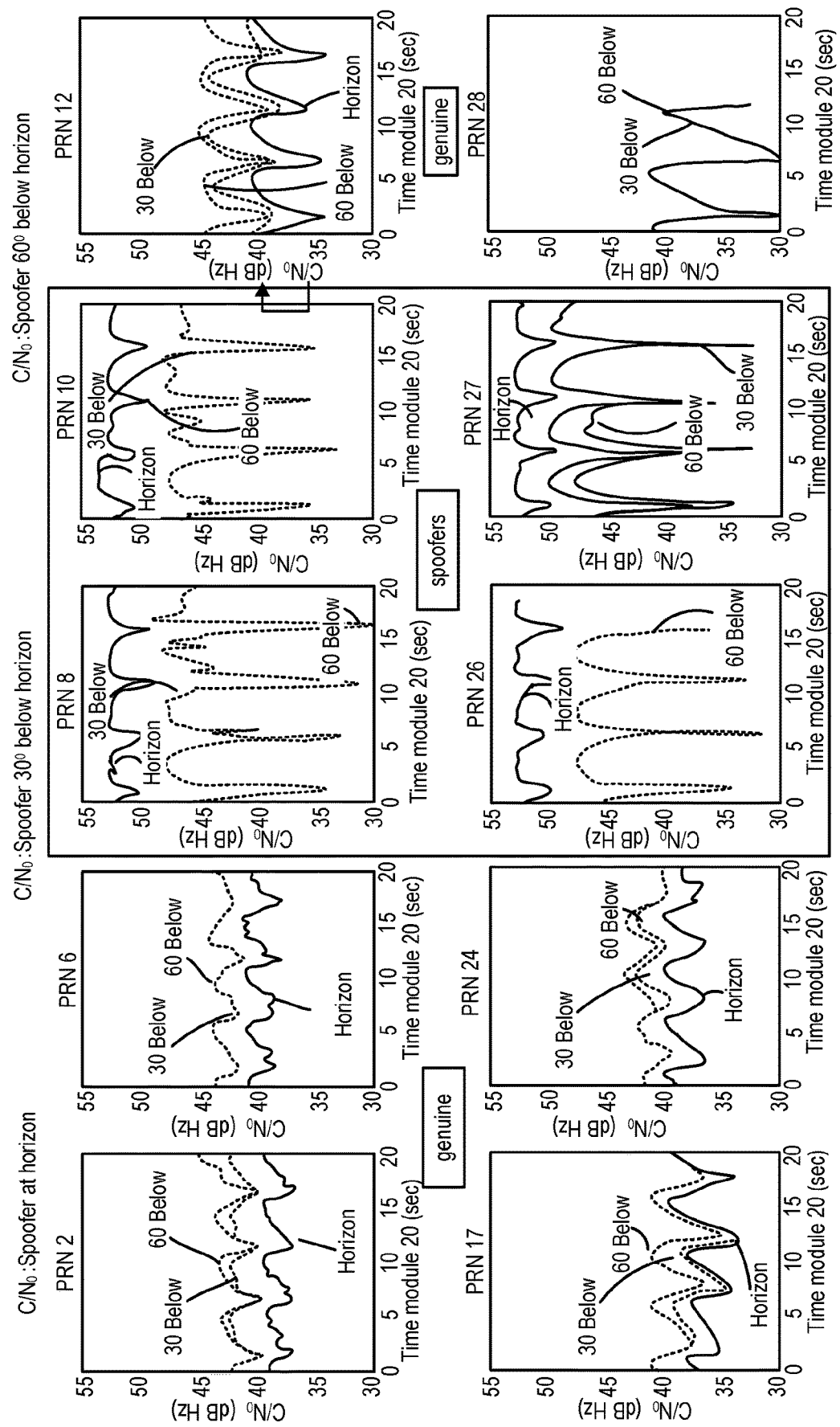
FIG. 7 plots carrier-to-noise density, $C/N_0$, for below the horizon signals, in accordance with some example embodiments.

FIG. 7 shows the $C/N_0$ values for satellites signals, which were received by the GPS antenna system 100 in accordance with some example. The x-axis in the plots shows time progression, modulo 20 seconds. The transmitted spoofed signal originated from an azimuth angle of 180 degrees and an elevation angles of 90 degrees (at the horizon of the antenna), 120 degrees (30 degrees below the horizon of the antenna), and 150 degrees (60 degrees below the horizon of the antenna). Like FIG. 6, FIG. 7 shows that the spoofing signal's effective signal strength is increased as its elevation angle up increases. Because the GPS receiver was tracking both genuine and spoofed signals, FIG. 7 enables a comparison of the characteristic $C/N_0$ behavior of both signal types. First, focusing on the green and red traces (captured when the spoofed signals was below the horizon of the antenna), the 4 spoofed satellites signals (PRN 8, 10, 26, 27) display the expected large $C/N_0$ greater ripple. Detection circuitry 197 may be used to detect this relatively large $C/N_0$ ripple to classify these 4 signals as spoof signals.

In the case of the blue trace (captured when the spoofed signals was at the horizon of the antenna), the larger ripple in $C/N_0$ for the spoofed signal case is not present. However, as mentioned previously, the ripple of the maximum and minimum $C/N_0$ values is a function of the elevation angle of the satellite and the time offset at which those max/min values appear as a function of the azimuth angle of the satellite. As such, a unique $C/N_0$ ripple for each satellite in the sky may be found. For the blue traces of FIG. 7, Table 1 below shows the max/min $C/N_0$ values and the relative phase offset (within the 5 second duration) at which those max/min values occurred. Table 1 also shows that the standard deviation in the maximum and minimum $C/N_0$ values for the five genuine satellites is over 10 times larger than that of the four spoofed satellites. Similarly, the standard deviation of the phase offset for the maximum and minimum $C/N_0$ values for the five genuine satellites is about 50 times larger than that of the four spoofed satellites. As noted, detection circuitry 197 may process the signal to determine the $C/N_0$ related features noted in Table 1 to detect whether the received signal is a spoof signal.

TABLE 1

| PRN | Min $C/N_0$ (dB-Hz) | Max $C/N_0$ (dB-Hz) | Phase offset of min $C/N_0$ (deg) | Phase offset of max $C/N_0$ (deg) |
| --- | --- | --- | --- | --- |
| 2 | 37.0 | 39.5 | 122 | 296 |
| 6 | 38.3 | 41.1 | 218 | 7 |
| 8 | 49.3 | 52.9 | 73 | 178 |
| 10 | 49.3 | 52.9 | 73 | 178 |
| 12 | 34.2 | 40.6 | 120 | 4 |
| 17 | 34.2 | 37.8 | 315 | 23 |
| 24 | 36.6 | 40.1 | 205 | 58 |
| 26 | 49.1 | 52.8 | 69 | 175 |
| 27 | 49.4 | 52.8 | 84 | 153 |
| Stdev genuine | 1.8 | 1.3 | 80.6 | 124.2 |
| Stdev spoofers | 0.1 | 0.1 | 2.1 | 2.1 |

The absence of a unique $C/N_0$ ripple, for each satellite, may be detected by detection circuitry 197 to indicate that the satellite signals are not originating from unique locations in the sky as would be the case with a GPS signal. This conclusion can be reached regardless of where the spoofed signal may originate.

The subject matter described herein may be embodied in a system, apparatus, method, and/or article depending on the desired configuration. For example, the decoder described herein and/or the processes described herein may be implemented using one or more of the following: at least one processor and at least one memory configured to allow the at least one processor to execute program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) may include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. An apparatus comprising:
   an antenna configured to receive a signal from a global navigation satellite system, wherein the antenna includes a first feed and a second feed;
   a hybrid coupler including a first hybrid input, a second hybrid input, a first hybrid output, a second hybrid output, wherein the first hybrid input is coupled to the first feed, the second hybrid input is coupled to the second feed, and wherein the first hybrid output provides as a first output a right hand circularly polarized signal formed based on a horizontally polarized signal and a vertically polarized signal detected at the antenna, wherein the second hybrid output provides as a second output a left hand circularly polarized signal formed based on the horizontally polarized signal and the vertically polarized signal detected at the antenna;
   a variable phase shifter including a shifter input and a shifter output, wherein when the apparatus is in a second mode, the shifter input is coupled via a switch to the first hybrid output providing as the first output the right hand circularly polarized signal, wherein the variable phase shifter is configured to induce a phase shift in the right hand circularly polarized signal; and
   a combiner including a first combiner input, a second combiner input, and a combiner output,
   wherein when the apparatus is in a first mode, the first hybrid output is coupled, via the switch to detection circuitry, to provide the right hand circularly polarized signal to the detection circuitry and the second hybrid output providing the left hand circularly polarized signal is coupled, via the switch, to a terminator, and
   wherein, when in apparatus is in a second mode configured to detect a presence of a spoof signal not transmitted by the global navigation satellite system or to suppress the spoof signal, the first combiner input is coupled, via the switch, to the shifter output providing the right hand circularly polarized signal with the induced phase shift, and the second combiner input is coupled, via the switch, to the second hybrid output providing as the second output the left hand circularly polarized signal, wherein the combiner output represents a combined right hand circularly polarized signal and left hand circularly polarized signal, wherein the combiner output is provided to the detection circuitry configured to detect the presence of the spoof signal not transmitted by the global navigation satellite system or configured to suppress the spoof signal.

2. The apparatus of claim 1, wherein the antenna comprises a GPS antenna.

3. The apparatus of claim 1, wherein the hybrid coupler comprises a 90 degree hybrid coupler.

4. The apparatus of claim 1, wherein the combiner comprises at least one of a power combiner and/or a Wilkinson combiner.

5. The apparatus of claim 1 further comprising:
   controller circuitry configured to change an operating mode of the apparatus from the first mode for receiving signals transmitted by a GPS satellite to at least the second mode to detect the spoof signal and/or steer a null to suppress the spoof signal.

6. The apparatus of claim 1, wherein when apparatus is in the second mode, the detection circuitry is configured to detect, in the combined right hand circularly polarized signal and left hand circularly polarized signal, a first amplitude of a first ripple in a first carrier to noise magnitude of the combined right hand circularly polarized signal and left hand circularly polarized signal and detect a second amplitude in a second ripple in the second carrier to noise magnitude of the combined right hand circularly polarized signal and left hand circularly polarized signal, wherein when the first amplitude is greater than the second amplitude, the detection circuitry determines the spoof signal is present in the received signal.

7. The apparatus of claim 1, wherein the detection circuitry is configured to detect at least a maximum $C/N_0$.

8. The apparatus of claim 1, wherein the detection circuitry is configured to detect at least a minimum $C/N_0$ and steer.

9. The apparatus of claim 1, wherein the detection circuitry is configured to detect at least a phase offset of the maximum $C/N_0$.

10. The apparatus of claim 1, wherein the detection circuitry is configured to detect at least a phase offset of the minimum $C/N_0$.

11. The apparatus of claim 1, wherein the first amplitude and the second amplitude are detected over a period of time associated with the variable phase shifter, the period of time associated with one revolution of the variable phase shifter.

* * * * *